United States Patent
Yadav

(10) Patent No.: US 7,610,485 B1
(45) Date of Patent: Oct. 27, 2009

(54) SYSTEM FOR PROVIDING SECURE MULTI-CAST BROADCASTS OVER A NETWORK

(75) Inventor: Navindra Yadav, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 1085 days.

(21) Appl. No.: 10/636,377

(22) Filed: Aug. 6, 2003

(51) Int. Cl.
*H04L 9/00* (2006.01)
(52) U.S. Cl. ...................... 713/163; 713/169
(58) Field of Classification Search ................ 713/150, 713/162, 163, 169
See application file for complete search history.

(56) References Cited

U.S. PATENT DOCUMENTS

| | | | |
|---|---|---|---|
| 6,182,214 B1 * | 1/2001 | Hardjono | 713/163 |
| 6,223,286 B1 * | 4/2001 | Hashimoto | 713/178 |
| 6,337,911 B1 * | 1/2002 | Dillon | 380/262 |
| 6,510,519 B2 * | 1/2003 | Wasilewski et al. | 713/168 |
| 6,684,331 B1 * | 1/2004 | Srivastava | 713/163 |
| 6,728,878 B2 * | 4/2004 | Dillon | 713/160 |
| 7,039,803 B2 * | 5/2006 | Lotspiech et al. | 713/163 |
| 7,055,030 B2 * | 5/2006 | Negawa | 713/163 |
| 7,185,362 B2 * | 2/2007 | Hawkes et al. | 726/4 |
| 7,334,125 B1 * | 2/2008 | Pellacuru | 713/163 |
| 7,346,171 B2 * | 3/2008 | Numao et al. | 380/286 |
| 7,400,732 B2 * | 7/2008 | Staddon et al. | 380/278 |
| 7,421,578 B1 * | 9/2008 | Huang et al. | 713/163 |
| 7,434,046 B1 * | 10/2008 | Srivastava | 713/163 |
| 2002/0001387 A1 * | 1/2002 | Dillon | 380/262 |
| 2002/0037736 A1 * | 3/2002 | Kawaguchi et al. | 455/518 |
| 2002/0044658 A1 * | 4/2002 | Wasilewski et al. | 380/239 |
| 2002/0170053 A1 * | 11/2002 | Peterka et al. | 725/31 |
| 2003/0039361 A1 * | 2/2003 | Hawkes et al. | 380/278 |
| 2003/0046539 A1 * | 3/2003 | Negawa | 713/163 |
| 2003/0061481 A1 * | 3/2003 | Levine et al. | 713/163 |
| 2003/0068047 A1 * | 4/2003 | Lee et al. | 380/278 |
| 2003/0081789 A1 * | 5/2003 | Numao et al. | 380/278 |
| 2004/0017916 A1 * | 1/2004 | Staddon et al. | 380/278 |
| 2004/0142661 A1 * | 7/2004 | Lane et al. | 455/41.2 |
| 2004/0158533 A1 * | 8/2004 | Messick et al. | 705/75 |
| 2005/0015583 A1 * | 1/2005 | Sarkkinen et al. | 713/150 |
| 2005/0021945 A1 * | 1/2005 | Niemi et al. | 713/163 |
| 2005/0097317 A1 * | 5/2005 | Trostle et al. | 713/163 |
| 2006/0291662 A1 * | 12/2006 | Takahashi et al. | 380/278 |
| 2007/0258596 A1 * | 11/2007 | Kahn et al. | 380/284 |

* cited by examiner

*Primary Examiner*—Nasser G Moazzami
*Assistant Examiner*—Fatoumata Traore
(74) *Attorney, Agent, or Firm*—Weaver Austin Villeneuve & Sampson LLP

(57) ABSTRACT

A system for providing secure multi-cast broadcasts. The system includes a broadcasting processing system, a security server processing system, and at least one receiving processing system. The security server provides an encryption key to the broadcasting processing system and the at least one receiving processing system. The broadcasting processing system then encrypts broadcast data with the encryption data and transmits the encrypted data over the network. The at least one receiving processing systems then receive the encrypted data and decrypt the data using the encryption key.

115 Claims, 10 Drawing Sheets

SYSTEM FOR PROVIDING SECURE MULTI-CAST BROADCASTS OVER A NETWORK

FIELD OF THE INVENTION

This invention relates to communications between processing systems connected to a network. More particularly, this invention relates to providing multi-cast broadcasts of data over the network. Still more particularly, this invention relates to a system that provides a system for allowing data of multi-cast broadcast to be encrypted.

PRIOR ART

In today's society, there are many networks that provide multi-cast broadcasts of digital data. For purposes of this discussion, a multi-cast broadcast is a transmission of data from single source to multiple receivers. It is a problem for designers of networks to provide an efficient manner in which to provide secure multi-cast broadcasts. A secure broadcast is a broadcast of encrypted data in order to prevent an unauthorized user from being able to generate the broadcast from data in intercepted packets.

Currently, secure multi-cast broadcasts must be encrypted specifically with the encryption key of a receiving system. Thus, the broadcasting processing system or any number of intermediate routers may have to generate different encrypted data for each processing system receiving the broadcast. Thus, network traffic increases linearly with the number of receiving broadcasting systems. Thus, there is a need in the art for a system that reduces the numbers of copies of a multi-cast broadcast that must transmitted over the network.

SUMMARY OF THE INVENTION

The above and other problems are solved and an advance in the art is made by the system and process for providing a secure multi-cast broadcast in accordance with this invention. In accordance with this invention, an efficient system is provided that can provide secure multi-cast broadcasts. An advantage of this system is the provision of secure multi-cast broadcast with minor adjustments to the Internet Protocol Version 6 (IPv6). Other advantages include authentication of users, authorization of users, and accounting of the multicast broadcast transmission.

In accordance with this invention, an encryption key is provided to a broadcasting processing system and each processing system that receives the multi-cast broadcast. In accordance with an exemplary embodiment of this invention, the broadcasting processing system determines that a multi-cast is to be secure. The broadcasting processing system then requests an encryption key from the security server. The security server assigns an encryption key to the broadcast. The encryption key is then transmitted to a broadcasting processing system. A record then is generated for the broadcast by the security server and the assigned encryption key for the broadcast is stored in the record.

In an exemplary embodiment, the broadcasting processing system then generates a multicast advertisement message that is transmitted over the network. The request is received by an intermediate processing system that routes data to connected to the processing system and all processing systems connected to the intermediate processing system are sent a query about the broadcast. One skilled in the art will note that the query may simply be forwarding the advertisement message to connected systems.

When a connected system is to receive the multi-cast broadcast, a reply to the query is transmitted to the intermediate processing system. The intermediate processing system authenticates the connected system. The intermediate processing system also communicates with the security server to determine whether the user is authorized to receive the broadcast. If authentication and authorization are successful, the intermediate processing system then transmits the encryption key for the broadcast to the security server. If the intermediate server does not have the encryption key, the intermediate processing system retrieves the key either from the broadcasting system or from the security server. The intermediate router then transmits an update to the security server including the receiving processing in a broadcast group. The processes described below are executed by the various processing systems to provide a secure multi-cast broadcast in this exemplary manner.

BRIEF DESCRIPTION OF THE DRAWINGS

The above and other aspects and features of this invention are presented in the detailed description given below and the following drawings.

DETAILED DESCRIPTION

The following description of exemplary embodiments of the invention is not intended to limit the scope of the invention to these exemplary embodiments, but rather to enable any person skilled in the art to make and use the invention.

This invention relates to processes, executed by various processing systems connected to a network to provide secure multi-cast broadcasts. The following is a discussion that provides an exemplary network that allows secure multi-cast broadcasts and the processes executed by various systems connected to the network to provide secure multi-cast broadcasts.

Figure 1:
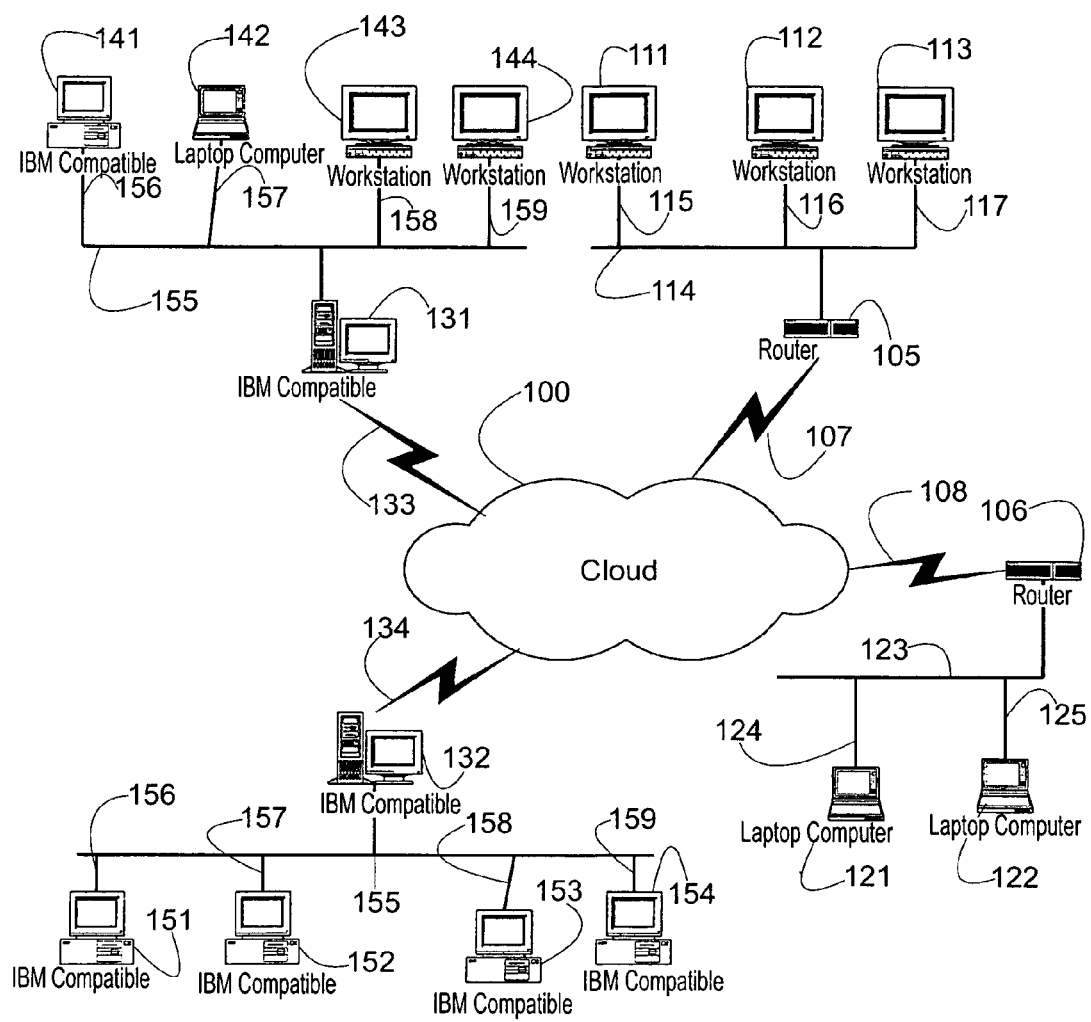
FIG. 1 illustrating a network that provides multi-cast broadcasts in accordance with this invention.

FIG. 1 illustrates a network 100 that includes processing devices that execute processes for providing secure multi-cast broadcasts in accordance with this invention. Network 100 is the Internet, a Local Area Network (LAN), a Wide Area Network (WAN) or other communications network that allows processing systems to transmit data between one another.

Routers are conventional routers or other processing systems, such as a server or switch, for transmitting data between processing systems connected to the routers and other processing systems in network 100. Routers 105-106 are connected to network 100 via path 107-108. Paths 107-108 are communications links between the router and network 100 such as a T1 telecommunications line. However, the exact communication link is unimportant with respect to the present invention and a discussion of the communications links is omitted for brevity.

In FIG. 1, router 105 is connected to workstations 111-113 via paths 114-117. Workstations 111-113 are computer systems that are connected to a local network to router 105 in order to transmit data to other processing systems in network 100. Router 106 is connected to laptop computers 121-122 via paths 123-125. Laptop computers 121-122 are portable computer systems that connect to router 106 via a local network to transmit data to other processing systems in network 100. One skilled in the art will recognize that each of the routers are shown connected to one type of computer system. However, any combinations of types of computer or processing systems may be connected to either of the routers 105-106. The exact type of systems connected to the routers 105-106 are not important to this invention. One skilled in the art will also recognize that path 114-118 and 123-125 may be conventional connections via a co-axial cables, Radio Frequency (RF) connections, wireless connections or any other conventional connections.

Server computers 131 and 132 are connected to network 100 via paths 133-134. Server computers 131 and 132 are computer systems that communicate and interact with other processing systems to transfer data. A server may also allow connected processing systems to communicate with other processing systems in network 100.

Server 131 is connected to computers systems 141-144 via paths 145-149. Computer systems 141-144 may be any type of computer system including but not limited to a desktop computer, a laptop computer, or a workstation. Path 145-149 may be a conventional wire connection using co-axial cable, other wiring, or wireless connection. The exact configuration of paths is unimportant for purposes of invention.

Server 132 is connected to computers systems 151-154 via paths 155-159. Computer systems 151-154 may be any type of computer system including but not limited to a desktop computer, a laptop computer, or a workstation. Path 155-159 may be a conventional wire connection using co-axial cable, other wiring, or may be wireless connections. The exact configuration of paths is unimportant for purposes of invention.

For purposes of this discussion, personal computer 141 is the processing system that is transmitting a secure multi-cast broadcast. One of the processing systems receiving the multi-cast broadcast is workstation 112 which is connected to the network via router 105 which performs the processes of an intermediate processing system. The security server may be server 132. Alternatively, any of computers 151-154 connected to server 132 may perform the processes provided by the security server.

Figure 2:
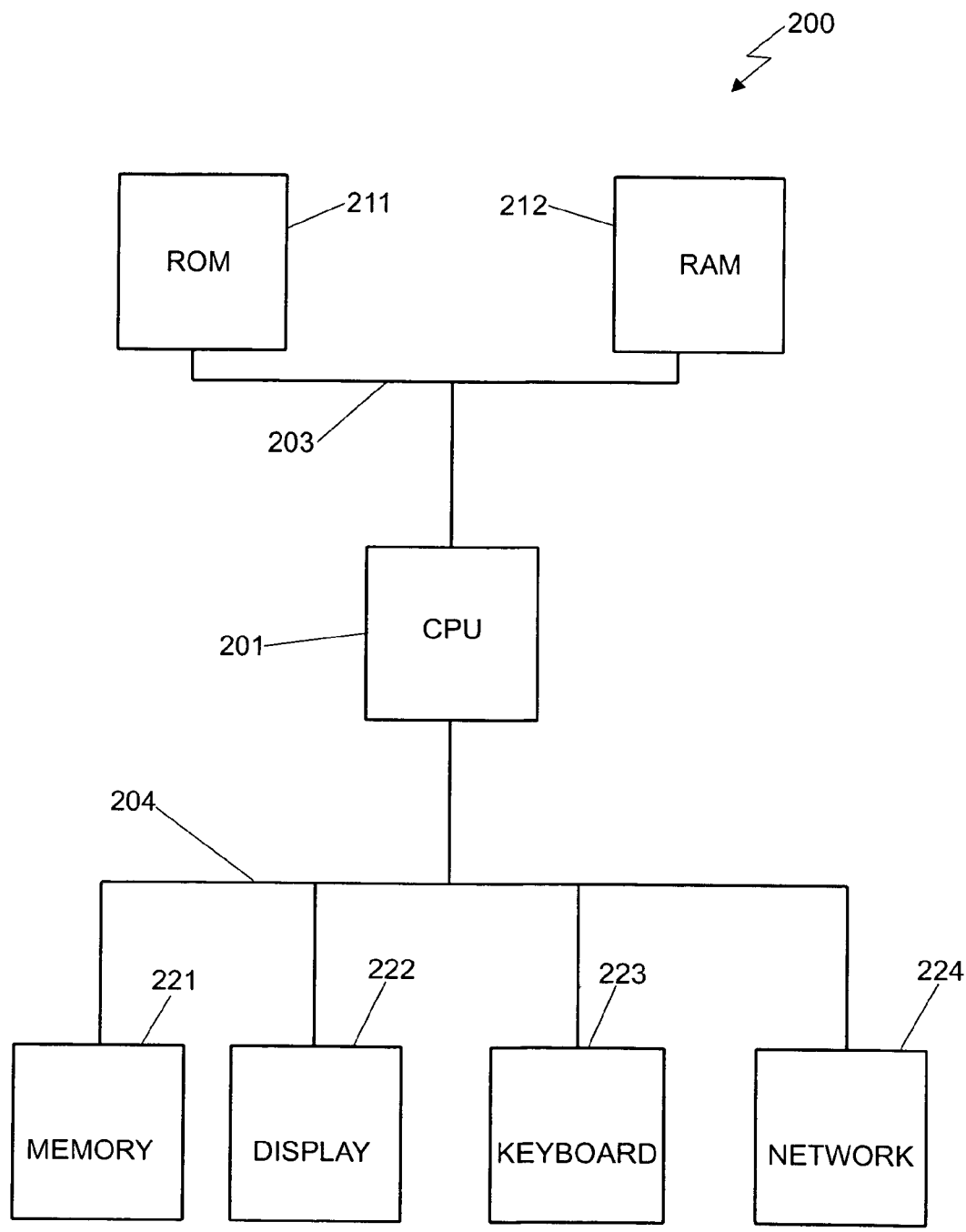
FIG. 2 illustrating an exemplary processing system included in devices connected to the network in accordance with this invention.

FIG. 2 illustrates an exemplary embodiment of a processing system 200. One skilled in the art will recognize that each device connected to network 100 in FIG. 1 includes a processing system 200. However, the exact configuration and devices connected to the processing system in each individual device in the network may vary depending upon the functions that the processing device performs.

Processing system 200 has a Central Processing Unit (CPU) 201. CPU 201 is a processor, microprocessor, or any combination of processors and/or microprocessors that execute instructions stored in memory to perform an application. CPU 201 is connected to a memory bus 203 and Input/Output (I/O) bus 204.

A non-volatile memory such as Read Only Memory (ROM) 211 is connected to CPU 201 via memory bus 203. ROM 211 stores instructions for initialization and other systems command of processing system 200. One skilled in the art will recognize that any memory that cannot be written to by CPU 201 may be used for the functions of ROM 211.

A volatile memory such as Random Access Memory (RAM) 212 is also connected to CPU 201 via memory bus 204. RAM 212 stores instructions for all processes being executed and data operated upon by the executed processes. One skilled in the art will recognize that other types of memories such as DRAM and SRAM may also be used as a volatile memory and that memory caches and other memory devices (not shown) may be connected to memory bus 204.

Peripheral devices including, but not limited to, memory 221, display 222, I/O device 223, and network connection device 224 that are connected to CPU 201 via I/O bus 204. I/O bus 204 carries data between the device and CPU 201. Memory 201 is a device for storing data unto a media. Some examples of memory 221 include read/write compact discs (CDs), and magnetic disk drives. Display 222 is a monitor or display and associated drivers that convert data to a display. I/O device 223 is a keyboard, a pointing device or other device that may be used by a user to input data. Network device 224 is a modem or Ethernet "card" that connects processing system 200 to a network. One skilled in the art will recognize that exact configuration and devices connected to each processing system in network 100 may vary depending upon the operations that the processing system performs in the network.

In accordance with an exemplary embodiment of this invention, the broadcasting processing system (personal computer 141) determines that a multi-cast is to be secure. The broadcasting processing system then requests an encryption key from the security server. The security server (server 132) assigns an encryption key to the broadcast. The encryption key is then transmitted to the broadcasting processing system (personal computer 141). A record then is generated for the broadcast by the security server (server 132) and the assigned encryption key for the broadcast is stored in the record.

The broadcasting processing system (personal computer 141) then generates a multicast advertisement message that is transmitted over the network. The request is received by an intermediate processing system (router 105) and all processing systems (workstations 111-113) connected to the router (router 105) are sent a query about the broadcast. One skilled in the art will note that the query may simply be forwarding the advertisement message to connected systems.

When a connected system is to receive the multi-cast broadcast, a reply to the query is transmitted to the intermediate processing system (router 105). The intermediate system (router 105) then transmits the encryption key for the broadcast to the connected processing system (work station 113). If the intermediate processing system does not have the encryption key, the intermediate processing system retrieves the key either from the broadcasting system (personal computer 141) or from the security server (server 131). The intermediate processing system (router 105) also transmits an update to the security server including the connected processing system joining a broadcast group. The processes described below are executed by the various processing systems to provide a secure multi-cast broadcast in this exemplary manner.

Figure 3:
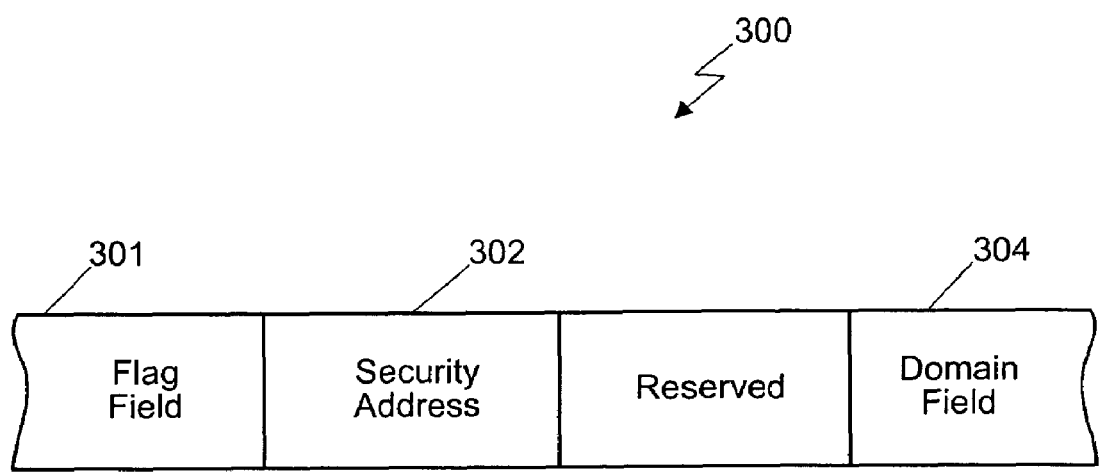
FIG. 3 illustrating a field of a header in an advertisement message transmitted in accordance with this invention.

FIG. 3 illustrates a block diagram of a header used in a packet including an advertisement message for a secure multi-cast broadcast. One skilled in the art will recognize that the order of the fields in message may be changed and that additional fields may be added to the header. Multi-cast header 300 includes field 301 which includes a flag for indicating that the multi-cast broadcast is a secure broadcast. Security address field 302 stores a network address of the security server that is providing the encryption key for the broadcast. Domain field 304 stores a network address from the Certificate Authority/Kerberos server. This is the network address for the domain of the security server. One skilled in the art will recognize that other fields may be included in the header, however, the shown fields are the fields required in an exemplary embodiment to perform the processes described below. Other fields may be added as required by one skilled in the art.

Figure 4:
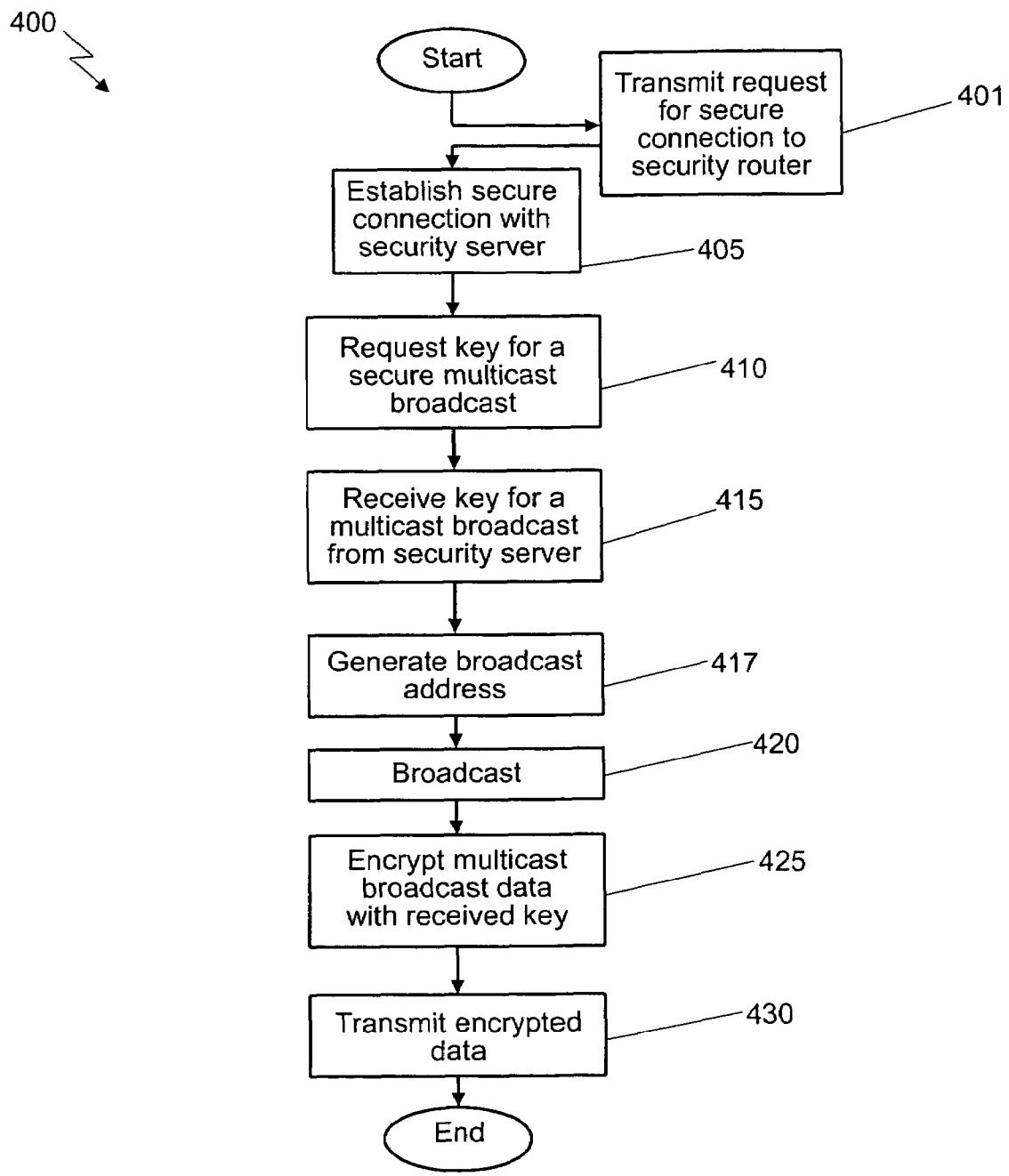
FIG. 4 illustrating a process executed by a processing system to transmit a secure multi-cast.

FIG. 4 illustrates flow diagram for a process executed by a processing system that is transmitting a multi-cast broadcast in order to receive an encryption key to provide the secure broadcast. Process 400 begins in step 401 with the broadcasting processing system transmitting a request for a secure connection to a security server. In step 405, the broadcasting processing system establishes a secure connection with a security server. This may be done by passing the security server security information including but not limited to a secret or public key of the broadcasting processing system. The broadcasting processing system then transmits a request for encryption key for the multi-cast broadcast to the security server in step 410.

In response to the request, the broadcasting processing system receives an encryption key over the secure connection to the security server in step 415. The assignment and processes for responding to the broadcasting processing system by the security server are described below. The broadcasting system then generates a session advertisement message for the secure multi-cast broadcast in step 417. The broadcasting processing system then transmits the session advertisement message over the network in step 419.

The broadcasting processing system encrypts the broadcast data using the encryption key in step 425 and transmits the encrypted broadcast data over the network in step 430. Preferably, the IPSecurity framework. One way that the multi-cast broadcast may be transmitted is using the PIM-SM protocol. After the transmission of the data is completed, process 400 ends.

Figure 5:
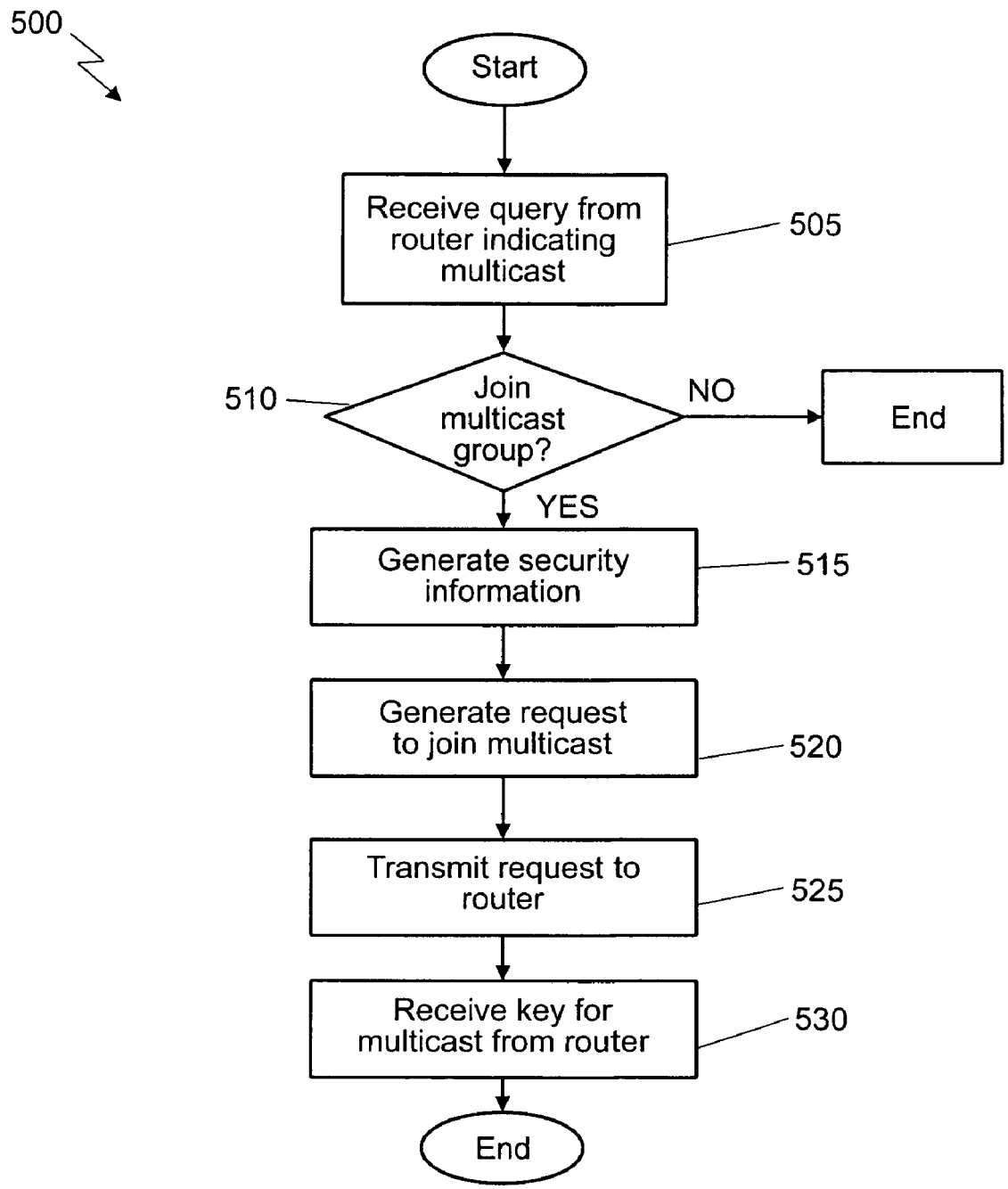
FIG. 5 illustrating a process executed by a processing system to receive the secure multi-cast broadcast.

FIG. 5 illustrates process 500 executed by a processing system that is to receive the multi-cast broadcast. Process 500 begins in step 505, with the receiving processing system receiving a query for those processing systems to receive the broadcast. This query may be a query transmitted by the router connected to the processing system in response to an advertisement message of the secure multi-cast broadcast or the advertisement message sent from the broadcasting processing system. In step 510, the receiving processor determines whether the processing system must join the multi-cast processing group. If the processing system does not need to join the multi-cast broadcast group process 500 ends.

Otherwise, the processing system generates security information for the processing system in step 515. The security information is then used to generate a response to the query in step 520. This response is either transmitted to the router connecting the processing system to the network or to the broadcasting processing depending upon the configuration of the system in step 525. In response to the transmission of the response request, the processing system receives the encryption key to decrypt the data of the multi-cast broadcast in step 530 and process 500 ends.

Figure 6:
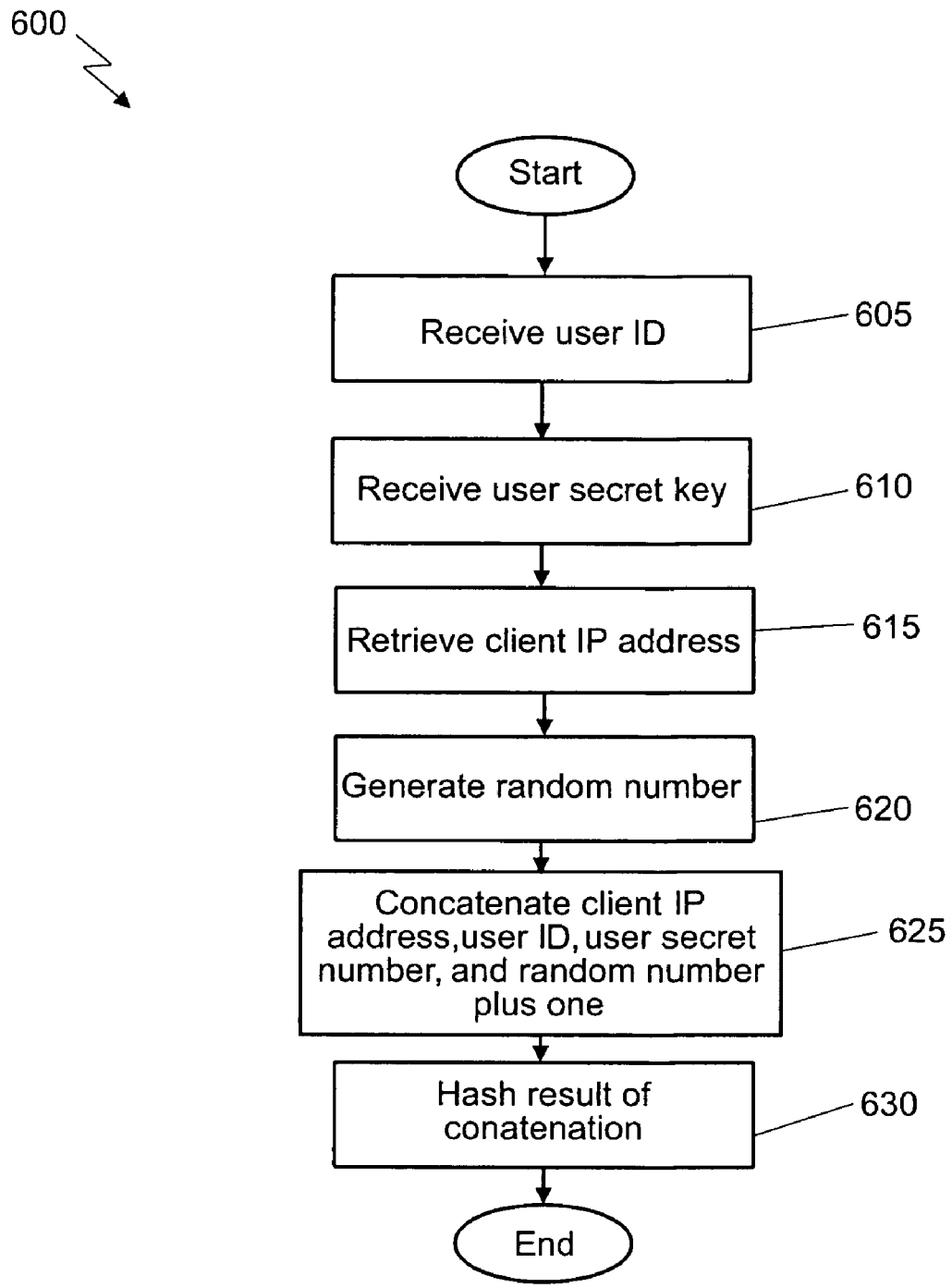
FIG. 6 illustrating a process executed by a processing system to generate security information to transmit a request to receive a secure multi-cast broadcast.

FIG. 6 illustrates an exemplary process 600 executed by a receiving processing system to generate security information to respond to a query or advertisement to join a multi-cast broadcast group. Process 600 begins in step 605 by receiving a user identification. In step 610, process 600 receives the user's secret or public encryption key. The network address, such as the Internet Protocol (IP) address, for the receiving processing system is retrieved from memory in step 615. Process 600 then generates a random number in step 620. In step 625, the user identification, user key, client IP address, and the random number plus one are concatenated together. The result of the concatenation is then hashed in 630 and process 600 ends. One skilled in the art will recognize that all or part of the retrieved information from process 600 may be inserted into the request or simply the result of the hash may be included.

Figure 7:
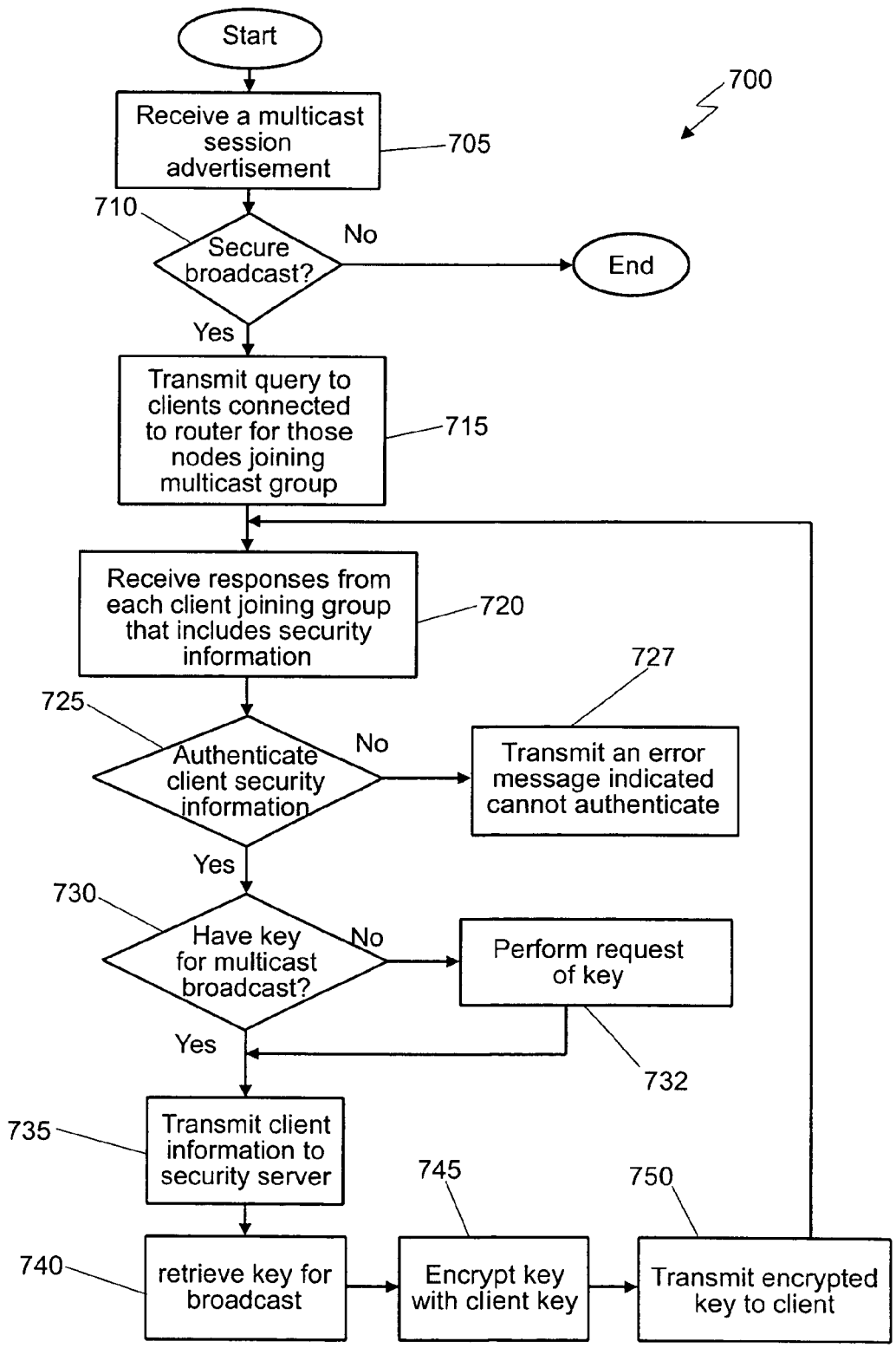
FIG. 7 illustrating a process executed by an intermediate server to provide a multi-cast broadcast to connect processing systems.
Figure 8:
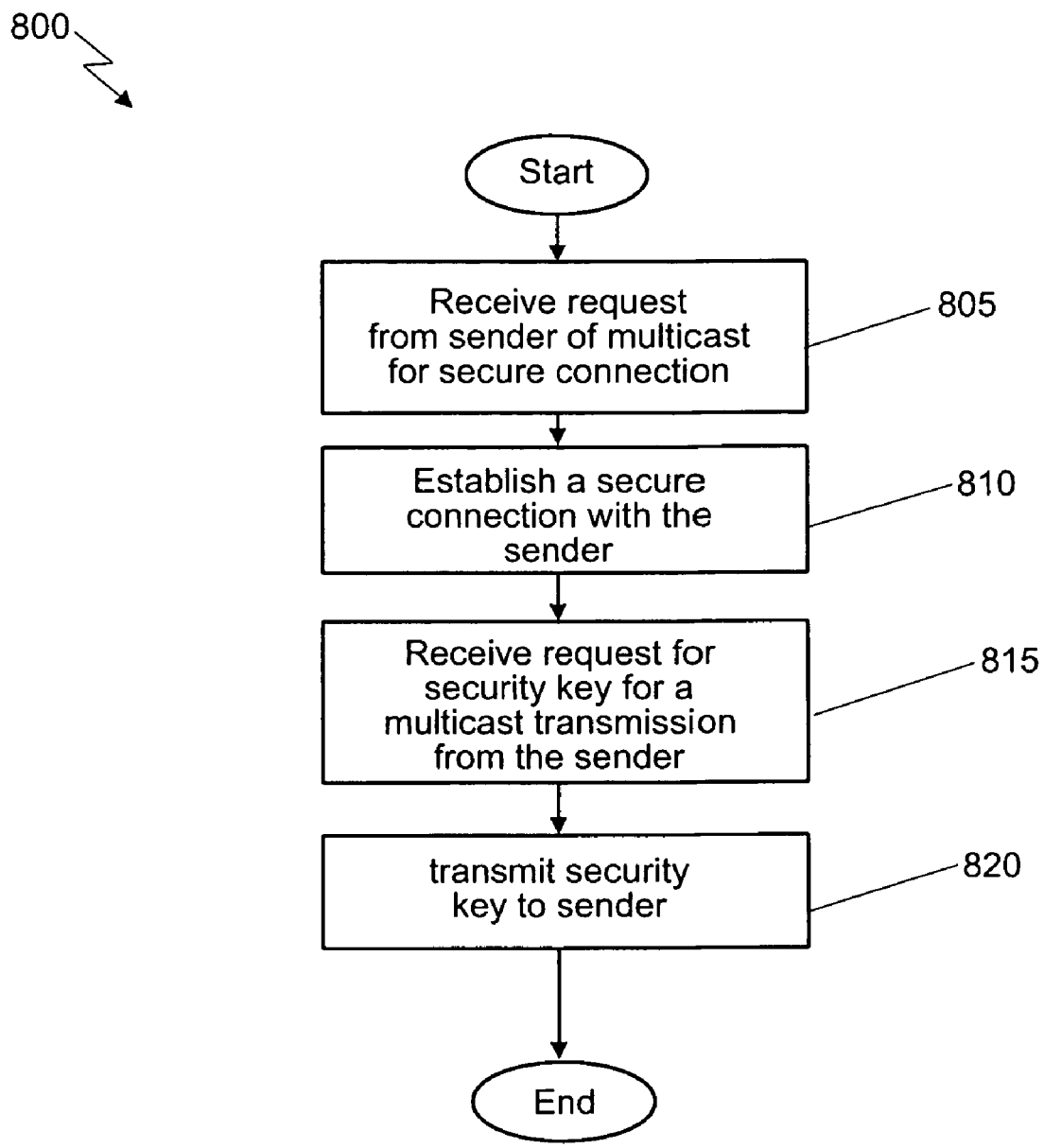
FIG. 8 illustrating a process executed by an intermediate server to receive an encrypted key for a multi-cast broadcast.

In an exemplary embodiment of this invention, the router, server, switch or other intermediate processing system that connects a processing system, such as a laptop, desktop personal computer, or work station to the network may receive the session advertisement message from the broadcasting processing system. The intermediate processing system then performs a process for allowing a connected processing system to receive the multicast broadcast. FIGS. 7 and 8 are processes executed by the router or server to allow a connected processing system to receive the multicast broadcast.

FIG. 7 illustrates a process 700 executed by a router or server to allow a connected processing system to join a group receiving the multi-cast broadcast. Process 700 begins in step 705 with the router receiving a multi-cast session advertisement from the broadcasting processing system. In step 710, the message is read to determine whether the multi-cast broadcast is a secure broadcast. If the multi-cast broadcast is not secure process 700 ends and the multi-cast broadcast is set-up in a conventional manner.

If the multi-cast broadcast is a secure broadcast, the router generates and transmits a query to each connected processing system in step 715. In step 720, process 700 receives a response from a connected processing system. The response is a request to join the group of receiving processing systems. In step 725, process 700 reads the security information included in the request and authenticates the user. If the user cannot be authenticated, the router denies the processing system access to the multi-cast broadcast encryption key and transmits an error message indicating that authentication failed.

If the user is authenticated, the router determines whether the router has the encryption key for the multi-cast broadcast. If the router does not have the encryption key, the router performs a process for retrieving the encryption key from the security server in step 732. After step 732 or if the router has the encryption key, the router transmits the user information to the security server in step 735. The encryption key is then retrieved in step 740. The router then encrypts the encryption key using the security information received in the request from the receiving processing system. Preferably, the encryption is performed using the user public or private key. The encrypted encryption key is then transmitted to the receiving processing system in step 750 and process 700 returns to step 720 to receive another response.

FIG. 8 illustrates an exemplary process for retrieving the encryption key for a multi-cast broadcast. Process 800 begins in step 805 with the router transmitting for a secure connection with the security server. In step 810, the router establishes a secure connection with the security server. As stated above, the secure connection may be provided using the IPSec ESP packet format.

The router then transmits a request for the encryption key for the multi-cast broadcast in step 815. The session identification from the broadcast advertisement message may be inserted into the request to identify the multi-cast broadcast. The router then receives the encryption key over the secure connection from the security server and process 800 ends.

Figure 9:
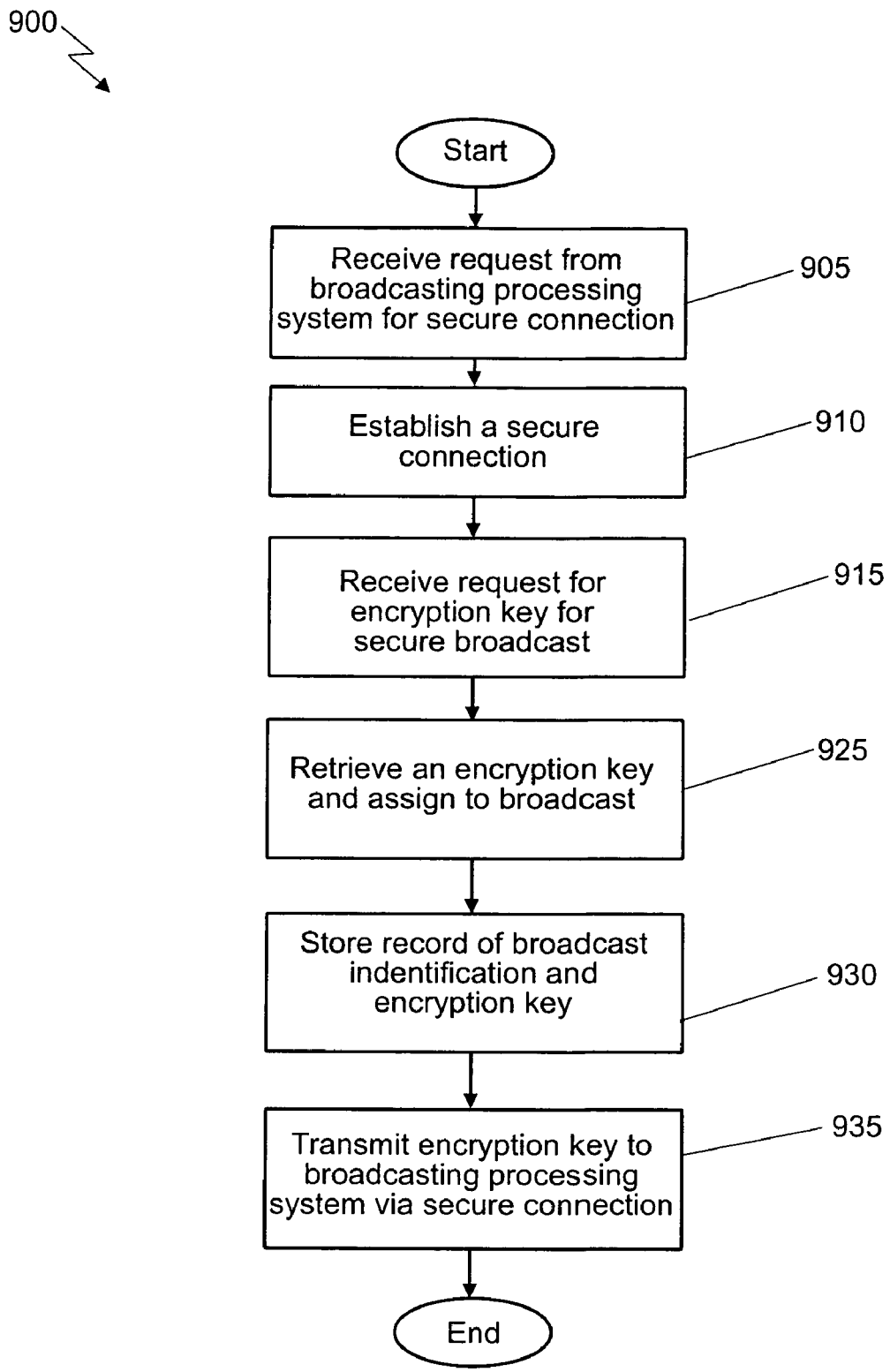
FIG. 9 illustrating a process executed by a security server to provide an encryption key to a processing system broadcasting a multi-cast broadcast.
Figure 10:
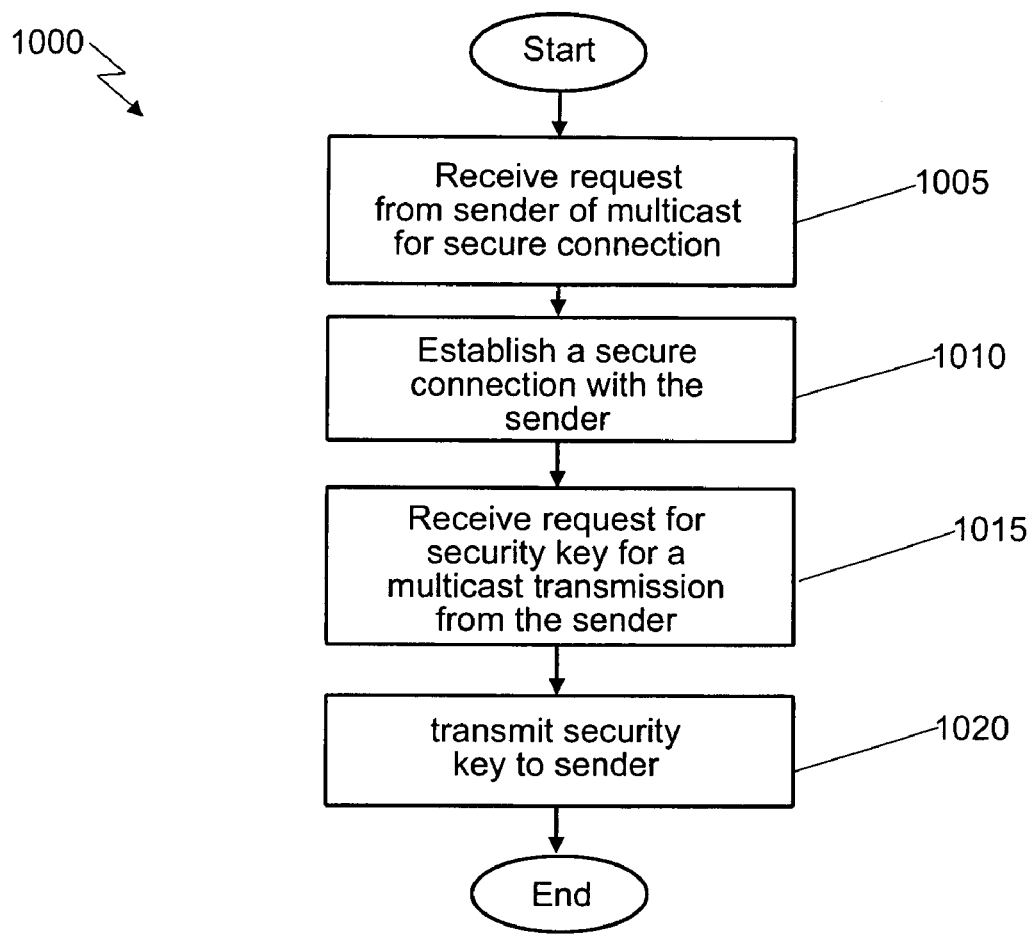
FIG. 10 illustrating a process for providing an encrypted key to an intermediate server.
Figure 11:
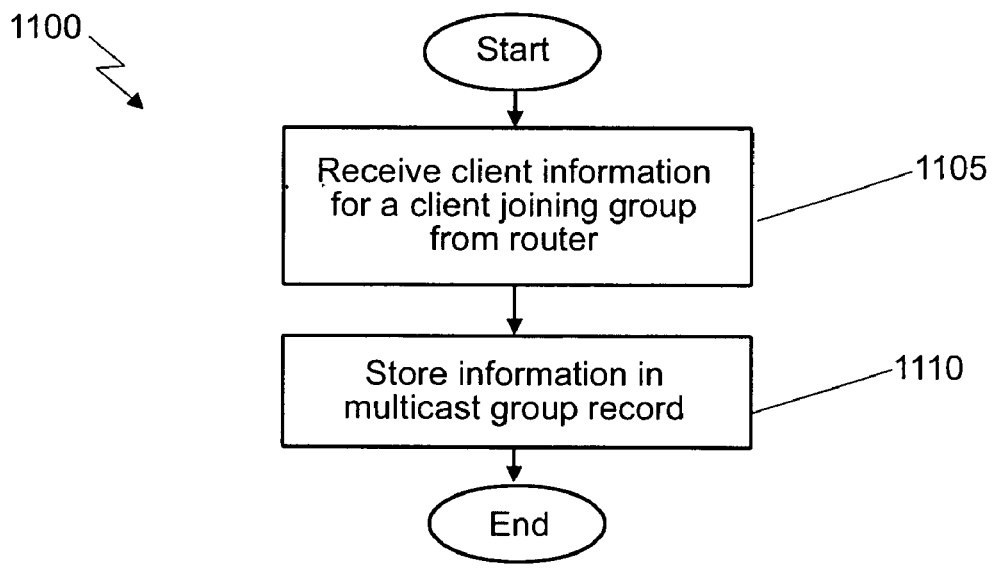
FIG. 11 illustrating a process executed by a security server to update a record of the multi-cast broadcast.

In accordance with an exemplary embodiment of this invention, a security server may provide the encryption key to the broadcasting processing system and the receiving processing system, as well as maintains a record of receiving processing systems for a multi-cast broadcast. FIGS. 9-11 illustrate exemplary processes executed by the security router to perform the above-identified functions.

FIG. 9 illustrates an exemplary process 900 for providing an encryption key to the broadcasting system. Process 900 begins in step 905 with the security server receiving a request of a secure connection from the broadcasting processing system. In step 910, the secure connection is established. As stated above, the secure connection may be provided using the IPSec ESP packet format.

In step 915, the security server receives a request from the broadcasting system for an encryption key for a secure multicast broadcast. In step 925, the security server either generates or retrieves an encryption key from memory and assigns the encryption key to the multi-cast broadcast. A record including an identification of the broadcast and the encryption key is then stored in memory for future use in step 930. The encryption key is then transmitted to the broadcasting processing system over the secure connection in step 935 and process 900 ends.

FIG. 10 illustrates an exemplary process for providing the encryption key to either an intermediate router or to a receiving processing system. Process 1000 begins in step 1005 with the security server receiving a request from another processing system for a secure connection. The secure connection is established in step 1010. The security server then receives a request for an encryption key for the multi-cast broadcast over the secure connection in step 1015. The security server then uses the identification of the multi-cast broadcast to retrieve the encryption key for the broadcast. The security server then transmits the encryption key for the multi-cast broadcast to the requesting processing system in step 1020 and process 1000 ends.

FIG. 11 illustrates an exemplary process for updating a record for a multi-cast broadcast. Process 1100 begins in step 1105 with the security server receiving a message indicating a new processing system has joined the group receiving the multi-cast broadcast. The security system then reads the information in the update and stores the information for the receiving processing system instep 1110 and process 1100 ends.

It will be appreciated by those of ordinary skill in the art that the invention can be embodied in other specific forms without departing from the spirit or essential character of this invention as set forth in the following claims. The present description is therefore considered in all respects to be illustrative and not restrictive. The scope of the invention is indicated by the following claims. All changes that come within the meaning and range of equivalents of the claims are intended to be within the scope of the claims.

What is claimed is:

1. A method for providing multicast broadcasts of data over a network, comprising:
receiving an encryption key by a broadcasting processing system that is transmitting a multicast broadcast of data, wherein said encryption key is used to encrypt said data of said multicast broadcast; and
providing said encryption key to each of a plurality of receiving processing systems connected to said network receiving said multicast broadcast, wherein said encryption key is used by each of said plurality of receiving processing systems to decrypt said data of said multicast broadcast;
wherein said step of providing said encryption key to each of said plurality of receiving processing systems comprises:
generating a broadcast advertisement message in said broadcasting processing system;
transmitting said broadcast advertisement message from said broadcasting processing system to at least one said plurality of receiving processing systems;
receiving a response message including a response to said broadcast advertisement message from at least one of said plurality of receiving processing systems, each response message indicating that the corresponding one of said plurality of receiving processing systems is to receive said multicast broadcast;
providing said encryption key to said at least one of said plurality of receiving processing systems responsive to said response message.

2. The method of claim 1, wherein said broadcast advertisement message indicates said multicast broadcast is a secure transmission.

3. The method of claim 1, further comprising:
inserting a network address of a security server processing system into a secure field in said broadcast advertisement message.

4. The method of claim 1, further comprising:
inserting a network address of a domain including a security server processing system into said broadcast advertisement message.

5. The method of claim 1, wherein providing said encryption key further comprises:
transmitting said encryption key from said broadcasting processing system to said one of said plurality of receiving processing systems responsive to receiving said response message in said broadcasting processing system.

6. The method of claim 1, wherein receiving said response message comprises:
receiving said response message by a security server processing system.

7. The method of claim 6, wherein providing said encryption key further comprises:
transmitting said encryption key from said security server processing system to said one of said plurality of receiving processing systems.

8. The method of claim 1, wherein said step of transmitting said broadcast advertisement message comprises:
determining said multicast broadcast is a secure transmission;
generating a query message, wherein said query message indicates said multicast broadcast is secure;
transmitting said query message to said at least one of said plurality of receiving processing systems;

receiving said response message from said one of said plurality of receiving processing systems responsive to said query message; and transmitting said encryption key to said one of said plurality of receiving processing systems responsive to receiving said response message.

9. The method of claim 1, wherein said response message includes security information for said one of said plurality of receiving processing systems.

10. The method of claim 1, wherein providing said encryption key comprises:
obtaining security information for said one of said plurality of receiving processing systems from said response message;
encrypting said encryption key with said security information for said one of said plurality receiving processing systems; and
transmitting said encrypted encryption key to said one of said receiving processing systems.

11. The method of claim 1, further comprising:
transmitting an identification of said one of said plurality of receiving processing systems.

12. The method of claim 1, further comprising:
updating records of a group for said multicast broadcast responsive to receiving an identification of said one of said plurality of receiving processing systems.

13. The method of claim 1, further comprising:
determining whether said encryption key for said multicast broadcast is stored in a memory; and
transmitting a request for said encryption key responsive to a determination that said encryption key is not stored in said memory.

14. The method of claim 13, wherein transmitting a request includes transmitting said request to a security server processing system, the method further comprising:
receiving said encryption key from said security server processing system.

15. A system for providing multicast broadcasts of data over a network, comprising:
a security server processing system configured to provide an encryption key to a broadcasting processing system transmitting a multicast broadcast of data, wherein said encryption key is used to encrypt said data of said multicast broadcast, wherein said security server processing system includes a processor and a memory, and wherein said broadcasting processing system includes a processor and a memory;
said security server processing system configured to provide said encryption key to each of a plurality of receiving processing systems connected to said network receiving said multicast broadcast, wherein said encryption key is used by each of said plurality of receiving processing systems to decrypt said data of said multicast broadcast;
said broadcasting processing system configured to generate a broadcast advertisement message and transmit said broadcast advertisement message to said plurality of receiving processing systems prior to said multi-cast broadcast, said broadcast advertisement message identifying said security server processing system in order to enable said plurality of receiving processing systems to request said encryption key from said security server processing system.

16. The system of claim 15, further comprising:
said broadcasting processing system configured to determine whether said multicast broadcast is a secure broadcast.

17. The system of claim 16, further comprising:
said broadcasting processing system configured to transmit a request to said security server processing system for said encryption key responsive to a determination that said multicast broadcast is secure; and
said broadcasting processing system configured to receive said encryption key from said security server processing system responsive to transmitting said request from said broadcasting processing system.

18. The system of claim 17, further comprising:
said broadcasting processing system configured to establish a secure communication between said broadcasting processing system and said security server processing system.

19. The system of claim 18, further comprising:
said security server processing system configured to transmit said encryption key from said security server processing system to said broadcasting processing system over said secure communication.

20. The system of claim 19, further comprising:
said security server processing system configured to assign said encryption key to said multicast broadcast responsive to receiving said request.

21. The system of claim 20, further comprising:
said security server processing system configured to store a record of said encryption key assigned to said multicast broadcast responsive to assigning said encryption key to said multicast broadcast.

22. The system of claim 15, further comprising:
said plurality processing systems configured to generate and transmit a response message to said broadcast advertisement message.

23. The system of claim 22, said plurality of receiving processing systems configured to transmit said response message to said security server processing system.

24. The system of claim 23, further comprising:
said security server processing system configured to transmit said encryption key to said plurality of receiving processing systems.

25. The system of claim 22, further comprising
a router processing system connected to at least one of said plurality of receiving processing systems configured to receive said advertisement message;
said router processing system configured to read said advertisement message;
said router processing system configured to determine said multicast broadcast is a secure transmission responsive to reading said advertisement message;
said router processing system configured to generate a query message, wherein said query message indicates said multicast broadcast is secure;
said router processing system configured to transmit said query message to said at least one of said plurality of receiving processing systems connected to said router processing system;
said router processing system configured to receive said response message from said one of said plurality of receiving processing systems responsive to said query message; and
said router processing system configured to transmit said encryption key to said one of said plurality of receiving processing systems responsive to receiving said response message.

26. The system of claim 25, said one of said plurality of receiving processing systems configured to retrieve security information for said one of said plurality of receiving processing systems; and said one of said plurality of receiving processing systems configured to insert said security information into said response message.

27. The system of claim 26, wherein said one of said plurality of receiving processing systems is configured to:
receive a user identification from a user;
retrieve a user secret key for said user;
retrieve a network address of said one of said plurality of receiving processing systems;
generate a random number;
concatenate said user identification, said network address, said user secret key, and said random number; and
hash a result of said concatenating to determine said security information.

28. The system of claim 25, further comprising:
said router processing system configured to receive said response message; and
said router processing system configured to transmit said encryption key to said one of said plurality of receiving processing systems.

29. The system of claim 28, said router processing system configured to read security information for said one of said plurality of receiving processing systems from said response message;
said router processing system configured to encrypt said encryption key with said security information for said one of said plurality receiving processing systems; and
said router processing system configured to transmit said encrypted encryption key to said one of said receiving processing systems.

30. The system of claim 28, said router processing system configured to transmit an identification of said one of said plurality of receiving processing systems to said security server processing system.

31. The system of claim 28, further comprising:
said router processing system configured to determine whether said router processing system has said encryption key for said multicast broadcast stored in a memory; and
said router processing system configured to transmit a request for said encryption to said security server processing system responsive to a determination that said encryption key is not stored in said memory.

32. The system of claim 15, said broadcasting processing system configured to insert a flag into a secure field in said advertisement message indicating said multicast broadcast is a secure transmission.

33. The system of claim 15, said broadcasting processing system configured to insert a network address of said security server processing system into a secure field in said advertisement message.

34. The system of claim 15, said broadcasting processing system configured to insert a network address of a domain including said security server processing system into said advertisement message.

35. The system of claim 15, said security server configured to update records of a group for said multicast broadcast responsive to receiving an identification of one of said plurality of receiving processing systems.

36. The system of claim 15, said security server processing system configured to receive a request for said encryption key; and
said security server processing system configured to transmit said encryption key in response to said request.

37. A system for providing multicast broadcasts of data over a network, comprising:
a security server processing system configured to provide an encryption key to a broadcasting processing system transmitting a multicast broadcast of data, wherein said encryption key is used to encrypt said data of said multicast broadcast, wherein said security server processing system includes a processor and a memory, and wherein said broadcasting processing system includes a processor and a memory;
said broadcast processing system configured to provide said encryption key to each of a plurality of receiving processing systems connected to said network receiving said multicast broadcast, wherein said encryption key is used by each of said plurality of receiving processing systems to decrypt said data of said multicast broadcast;
said broadcasting processing system configured to generate a broadcast advertisement message and transmit said broadcast advertisement message to said plurality of receiving processing systems prior to said multi-cast broadcast in order to identify said plurality of receiving processing systems that are to receive said encryption key.

38. The system of claim 37, further comprising:
said broadcasting processing system configured to transmit said encryption key to one of said plurality of receiving processing systems responsive to receiving a response message from said one of said plurality of receiving processing systems.

39. An apparatus for providing multicast broadcasts of data over a network, comprising:
means for providing an encryption key from a security server means to a broadcasting processing means transmitting a multicast broadcast of data, wherein said encryption key is used to encrypt said data of said multicast broadcast; and
said security server means for providing said encryption key to each of a plurality of receiving processing systems connected to said network receiving said multicast broadcast, wherein said encryption key is used by each of said plurality of receiving processing systems to decrypt said data of said multicast broadcast;
said broadcasting processing means for generating a broadcast advertisement message and transmitting said broadcast advertisement message to said plurality of receiving processing systems prior to said multicast broadcast, said broadcast advertisement message identifying said security server means in order to enable said plurality of receiving processing systems to request said encryption key from said security server means.

40. The apparatus of claim 39, further comprising:
means for determining said multicast broadcast is a secure broadcast in said broadcasting processing means.

41. The apparatus of claim 39, further comprising:
means for transmitting a request in said broadcasting processing means to said security server means for said encryption key responsive to a determination that said multicast broadcast is secure; and
means for receiving said encryption key from said security server means in said broadcasting processing means responsive to transmitting said request from said broadcasting processing system.

42. The apparatus of claim 41, further comprising:
means for establishing a secure communication between said broadcasting processing means and said security server means.

43. The apparatus of claim 42, further comprising:
means for transmitting said encryption key from said security server means to said broadcasting processing means over said secure communication.

44. The apparatus of claim 43, further comprising:
means for assigning said encryption key to said multicast broadcast in said security server processing means responsive to receiving said request.

45. The apparatus of claim 44, further comprising:
means for storing a record of said encryption key assigned to said multicast broadcast responsive to assigning said encryption key to said multicast broadcast.

46. The apparatus of claim 39, further comprising:
means for inserting a network address of said security server processing system into a secure field in said advertisement message.

47. The apparatus of claim 39, further comprising:
means for inserting a network address of a domain including said security server processing system into said advertisement message.

48. The apparatus of claim 39, wherein said means for transmitting said response message comprises:
means for transmitting a response message from said one of said plurality of receiving processing means to said security server means.

49. The apparatus of claim 48, further comprising:
means for transmitting said encryption key from said security server means to said one of said plurality of receiving processing means.

50. The apparatus of claim 39, further comprising:
means for receiving a request for said encryption key in said security server means; and
means for transmitting said encryption key from said security server means in response to said request.

51. An apparatus for providing multicast broadcasts of data over a network, comprising:
a security server processing means for providing an encryption key to a broadcasting processing system means configured for transmitting a multicast broadcast of data, wherein said encryption key is used to encrypt said data of said multicast broadcast;
said broadcast processing system means configured to provide said encryption key to each of a plurality of receiving processing systems connected to said network receiving said multicast broadcast, wherein said encryption key is used by each of said plurality of receiving processing systems to decrypt said data of said multicast broadcast;
said broadcasting processing system means being further configured to generate a broadcast advertisement message and transmit said broadcast advertisement message to said plurality of receiving processing systems prior to said multi-cast broadcast in order to identify said plurality of receiving processing systems that are to receive said encryption key.

52. The apparatus of claim 51, further comprising:
means for inserting a flag into a secure field in said advertisement message indicating said multicast broadcast is a secure transmission.

53. The apparatus of claim 51, further comprising:
means for generating a response message to said broadcast advertisement message in one of said plurality processing means;
means for transmitting said response message from said one of said plurality of receiving processing means; and means for receiving said encryption key in said one of said plurality of receiving processing means responsive to transmitting said response message.

54. The apparatus of claim 53, further comprising:
means for transmitting said encryption key in said broadcasting processing means to said one of said plurality of receiving processing means responsive to receiving said response message.

55. The apparatus of claim 51, wherein said means for transmitting said advertisement message comprises:
means for receiving said advertisement message from said broadcasting processing means in a router means connected to at least one of said plurality of receiving processing means;
means for reading said advertisement message in said router means;
means for determining said multicast broadcast is a secure transmission in said router means responsive to reading said advertisement message;
means in said router processing system for generating a query message wherein said query message indicates said multicast broadcast is secure;
means in said router processing system for transmitting said query message to said at least one of said plurality of receiving processing systems connected to said router processing system;
means for receiving said response message from said one of said plurality of receiving processing means in said router processing means responsive to said query message; and
means for transmitting said encryption key in said router processing means to said one of said plurality of receiving processing means responsive to receiving said response message.

56. The apparatus of claim 55, wherein said means for generating said response message in said one of said plurality of receiving processing means comprises:
means in said one of said plurality of receiving processing means configured to retrieve security information for said one of said plurality of receiving processing systems; and
means for inserting said security information into said response message in said one of said plurality of receiving processing means.

57. The apparatus of claim 55, wherein said means for retrieving said security information comprises:
means for receiving a user identification from a user in said one of said plurality of receiving processing means;
means for retrieving a user secret key for said user in said one of said plurality of receiving processing means;
means in said one of said plurality of receiving processing means for retrieving a network address of said one of said plurality of receiving processing systems;
means for generating a random number in said one of said plurality of receiving processing means;
means for concatenating said user identification, said network address, said user secret key, and said random number added to one in said one of said plurality of receiving processing means; and
means for hashing a result of said concatenating to determine said security information in said one of said plurality of receiving processing means.

58. The apparatus of claim 55, further comprising:
means for receiving said response message in said router processing means; and means for transmitting said encryption key from said router processing means to said one of said plurality of receiving processing means.

59. The apparatus of claim 58, wherein said means for transmitting said encryption key to said one of said plurality of receiving processing means comprises:
   means for reading security information for said one of said plurality of receiving processing means from said response message in said router processing means;
   means for encrypting said encryption key with said security information in said router means for said one of said plurality of receiving processing means; and
   means for transmitting said encrypted encryption key from said router processing means to said one of said receiving processing means.

60. The apparatus of claim 58, further comprising:
   means for transmitting an identification of said one of said plurality of receiving processing systems from said router means to said security server means.

61. The apparatus of claim 58, further comprising:
   means for updating records of a group for said multicast broadcast in said security server means responsive to receiving said identification of said one of said plurality of receiving processing systems from said router processing system.

62. The apparatus of claim 58, further comprising:
   means for determining whether said router processing system has said encryption key for said multicast broadcast stored in a memory of said router means; and
   means for transmitting a request for said encryption key from said router means to said security server means responsive to a determination that said encryption key is not stored in said memory.

63. A computer readable storage medium carrying one or more instructions for providing multicast broadcasts of data over a network, the one more instructions including instructions which executed by one or more processors, cause the one or more processors to perform the method, comprising:
   receiving an encryption key by a broadcasting processing system that is transmitting a multicast broadcast of data, wherein said encryption key is used to encrypt said data of said multicast broadcast; and
   providing said encryption key to each of a plurality of receiving processing systems connected to said network receiving said multicast broadcast, wherein said encryption key is used by each of said plurality of receiving processing systems to decrypt said data of said multicast broadcast;
   wherein said step of providing said encryption key to each of said plurality of receiving processing systems comprises:
      generating a broadcast advertisement message in said broadcasting processing system;
      transmitting said broadcast advertisement message from said broadcasting processing system to at least one said plurality of receiving processing systems;
      receiving a response message including a response to said broadcast advertisement message from at least one of said plurality of receiving processing systems, each response message indicating that the corresponding one of said plurality of receiving processing systems is to receive said multicast broadcast;
      providing said encryption key to said at least one of said plurality of receiving processing systems responsive to said response message.

64. The computer readable storage medium of claim 63, the method further comprising:
   determining said multicast broadcast is a secure broadcast in said broadcasting processing system.

65. The computer readable storage medium of claim 64, further comprising:
   transmitting a request to a security server processing system for said encryption key responsive to a determination that said multicast broadcast is secure; and
   receiving said encryption key from said security server processing system in said broadcasting processing system responsive to transmitting said request from said broadcasting processing system.

66. The computer readable storage medium of claim 65, wherein said method further comprises:
   establishing a secure communication between said broadcasting processing system and said security server processing system.

67. The computer readable storage medium of claim 66, wherein said method further comprises:
   transmitting said encryption key from said security server processing system to said broadcasting processing system over said secure communication.

68. The computer readable storage medium of claim 65, wherein said method further comprises:
   assigning said encryption key to said multicast broadcast in said security server processing system responsive to receiving said request.

69. The computer readable storage medium of claim 68, wherein said method further comprises:
   storing a record of said encryption key assigned to said multicast broadcast responsive to assigning said encryption key to said multicast broadcast.

70. The computer readable storage medium of claim 63, wherein said step of providing said encryption key comprises:
   receiving said broadcast advertisement message by one of said plurality of receiving processing systems;
   generating a response message by said one of said plurality of receiving processing systems, said response message including a response to said broadcast advertisement message;
   transmitting said response message from said one of said plurality of receiving processing systems; and
   receiving said encryption key by said one of said plurality of receiving processing systems responsive to transmitting said response message.

71. The computer readable storage medium of claim 70, wherein said step of transmitting said response message of said method comprises:
   transmitting said response message from said one of said plurality of said receiving processing systems to said broadcasting system.

72. The computer readable storage medium of claim 71 wherein said method further comprises:
   transmitting said encryption key from said broadcasting processing system to said one of said plurality of receiving processing systems responsive to receiving said response message in said broadcasting processing system.

73. The computer readable storage medium of claim 70, wherein said step of transmitting said advertisement message of said method comprises:
   receiving said advertisement message in a routing processing system connected to at least one of said plurality of receiving processing systems;
   reading advertisement message in said router processing system;

determining said multicast broadcast is a secure transmission in said routing processing system responsive to reading said advertisement message;
generating a query message in said router processing system wherein said query message indicates said multicast broadcast is secure;
transmitting said query message from said router processing system to said at least one of said plurality of receiving processing systems connected to said router processing system;
receiving said response message from said one of said plurality of receiving processing systems to said router processing systems responsive to said query message; and
transmitting said encryption key from said router processing system to said one of said plurality of receiving processing systems responsive to receiving said response message.

74. The computer readable storage medium of claim 73, wherein said step of retrieving said security information of said method comprises:
receiving a user identification from a user in said one of said plurality of receiving processing systems;
retrieving a user secret key for said user in said one of said plurality of receiving processing systems;
retrieving a network address of said one of said plurality of receiving processing systems in said one of said plurality of receiving processing systems;
generating a random number in said one of said plurality of receiving processing systems;
concatenating said user identification, said network address, said user secret key, and said random number added to one in said one of said plurality of receiving processing systems; and
hashing a result of said concatenating to determine said security information.

75. The computer readable storage medium of claim 73, wherein said method further comprises:
receiving said response message in said router processing system; and
transmitting said encryption key from said router processing system to said one of said plurality of receiving processing systems.

76. The computer readable storage medium of claim 75, wherein said step transmitting said encryption key from said server processing system to said one of said plurality of receiving processing systems of said method comprises:
reading security information for said one of said plurality of receiving processing systems from said response message in said router processing system;
encrypting said encryption key in said router processing system with said security information for said one of said plurality receiving processing systems; and
transmitting said encrypted encryption key from said router processing system to said one of said receiving processing systems.

77. The computer readable storage medium of claim 75, wherein said method further comprises:
transmitting an identification of said one of said plurality of receiving processing systems from said router processing to said security server processing system.

78. The computer readable storage medium of claim 77, wherein said method further comprises:
updating records of a group for said multicast broadcast responsive to receiving said identification of said one of said plurality of receiving processing systems from said router processing system.

79. The computer readable storage medium of claim 77, wherein said method further comprises:
determining whether said router processing system has said encryption key for said multicast broadcast stored in a memory; and
transmitting a request for said encryption key from said router processing system to said security server processing system responsive to a determination that said encryption key is not stored in said memory.

80. The computer readable storage medium of claim 79, wherein said method further comprises:
receiving said request for said encryption key in said security server processing system; and
transmitting said encryption key from said security server processing system to said router processing system.

81. The computer readable storage medium of claim 80, wherein said step of transmitting said encryption key from said security server processing system to said router processing system of said method comprises:
establishing a secure communication between said router processing system and said security server processing system to transmit said encryption key.

82. The computer readable storage medium of claim 70, further comprising:
retrieving security information for said one of said plurality of receiving processing systems; and
inserting said security information into said response message.

83. The computer readable storage medium of claim 63, further comprising:
inserting a flag into a secure field in said advertisement message indicating said multicast broadcast is a secure transmission.

84. The computer readable storage medium of claim 63, wherein said step of generating said response message of said method comprises:
inserting a network address of a security server processing system from which said encryption key is to be obtained into a secure field in said advertisement message.

85. The computer readable storage medium of claim 63, further comprising:
inserting a network address of a domain including a security server processing system from which said encryption key is to be obtained into said advertisement message.

86. The computer readable storage medium of claim 63, wherein said step of transmitting said response message of said method comprises:
transmitting said response message from said one of said plurality of receiving processing systems to a security server processing system from which said encryption key is to be obtained.

87. The computer readable storage medium of claim 86, wherein said method further comprises:
transmitting said encryption key from said security server processing system to said one of said plurality of receiving processing systems.

88. A system for providing secure multi-cast broadcast, comprising:
a security server processing system that provides an encryption key, wherein said security server processing system includes a processor and a memory;
a broadcasting processing system that receives said encryption key from said security server processing system transmitted over a network, encrypts data for a multi-cast broadcast with said encryption key and transmits encrypted data of said multi-cast broadcast over said network, wherein said broadcasting processing system includes a processor and a memory; and at least one receiving processing system that receives said encryption key from said security processing system over said network, receives said encrypted data from said broadcasting processing system over said network, and decrypts said encrypted data;

wherein said broadcasting processing system transmits a multi-cast advertisement message prior to said multi-cast broadcast, the multi-cast advertisement message identifying said security processing system in order to enable said at least one receiving processing system to obtain said encryption key in order to decrypt said encrypted data of said multi-cast broadcast.

89. The system of claim 88, further comprising:

an intermediate router processing system connecting said at least one receiving processing system to said network, wherein said intermediate router processing system receives said multi-cast advertisement, generates a request to join said multi-cast broadcast and transmits said request to said at least one receiving processing system.

90. The system of claim 89, wherein said at least one receiving processing system receives said request, determines whether said at least one receiving processing system is to receive said multi-cast broadcast, generates a response responsive to a determination that said at least one receiving processing system is to receive said multi-cast broadcast and transmitting said response to said intermediate router processing system.

91. The system of claim 90, wherein said intermediate router processing system transmits said encryption key to said at least one receiving processing system responsive to receiving said request.

92. The system of claim 91, wherein said intermediate router processing system determines whether said encryption key is stored in a memory of said intermediate router processing system, transmits a request for said encryption key to said security server processing system in response to a determination that said encryption key is not stored in said memory, and receiving said encryption key from said security server processing system.

93. The system of claim 92, wherein said security server processing system receives said request from said intermediate router processing system and transmits said encryption key to said intermediate router processing system responsive to receiving said request.

94. The system of claim 93, wherein said intermediate processor system and said security server processing system establish a secure connection over which to transmit said encryption key.

95. The system of claim 91, wherein said intermediate processing system transmits identification of said at least one receiving processing system to said security server responsive to receiving said request.

96. The system of claim 95, wherein said security server processing system stores said identification information in a record for said multi-cast broadcast.

97. An apparatus for providing secure multi-cast broadcast comprising:

a security server means including means for providing an encryption key;

a broadcasting means including:

means for receiving said encryption key from said security server means transmitted over a network, means for encrypting data for a multi-cast broadcast with said encryption key, and means for transmitting encrypted data of said multi-cast broadcast over said network; and at least one receiving means comprising:

means for receiving said encryption key from said security server means over said network, means for receiving said encrypted data from said broadcasting means over said network, and means for decrypting said encrypted data; and means for transmitting a multi-cast advertisement message prior to said multi-cast broadcast, the multi-cast advertisement message identifying said security server means in order to enable said at least one receiving means to obtain said encryption key in order to decrypt said encrypted data of said multi-cast broadcast.

98. The apparatus of claim 97, further comprising:

an intermediate router means connecting said at least one receiving means to said network wherein said intermediate router means includes:

means for receiving said multi-cast advertisement, means for generating a request to join said multi-cast broadcast, and means for transmitting said request to said at least one receiving means.

99. The apparatus of claim 98, wherein said at least one receiving means further includes:

means for receiving said request;

means for determining whether said at least one receiving means is to receive said multi-cast broadcast;

means for generating a response responsive to a determination that said at least one receiving means is to receive said multi-cast broadcast; and means for transmitting said response to said intermediate router means.

100. The apparatus of claim 99, wherein said intermediate router means further includes:

means for transmitting said encryption key to said at least one receiving means responsive to receiving said request.

101. The apparatus of claim 100, wherein said intermediate router means further comprises:

means for determining whether said encryption key is stored in a memory of said intermediate router means;

means for transmitting a request for said encryption key to said security server means in response to a determination that said encryption key is not stored in said memory; and means for receiving said encryption key from said security server means.

102. The apparatus of claim 101, wherein said security server means further comprises:

means for receiving said request from said intermediate router means; and means for transmitting said encryption key to said intermediate router means responsive to receiving said request.

103. The apparatus of claim 102 wherein said intermediate processor means and said security server means comprise:

means for establishing a secure connection over which to transmit said encryption key.

104. The apparatus of claim 100, wherein said intermediate router means comprises:

means for transmitting identification of said at least one receiving means to said security server responsive to receiving said request.

105. The apparatus of claim 104, wherein said security server means includes:
    means for storing said identification information in a record for said multi-cast broadcast.
106. A method for providing secure multi-cast broadcasts comprising:
    receiving an encryption key from a security server processing system;
    transmitted over a network in a broadcasting processing system;
    encrypting data for a multi-cast broadcast with said encryption key in said broadcasting processing system;
    transmitting encrypted data of said multi-cast broadcast over said network from said broadcasting processing system to at least one receiving processing system;
    receiving said encryption key from said security server processing system over said network in at least one receiving processing system;
    receiving said encrypted data from said broadcasting processing system in said at least one receiving processing system over said network; and
    decrypting said encrypted data with said encryption key in said at least one receiving processing system; and
    transmitting a multi-cast advertisement message from said broadcasting processing system prior to said multi-cast broadcast, said multi-cast advertisement message soliciting a response message from said at least one receiving processing system in order to identify said at least one receiving processing system to receive said encryption key.
107. The method of claim 106, further comprising:
    receiving said multi-cast advertisement in an intermediate router processing system;
    generating a request to join said multi-cast broadcast in said intermediate router processing system; and
    transmitting said request from said intermediate router processing system to said at least one receiving processing system.
108. The method of claim 107, further comprising:
    receiving said request in said at least one receiving processing system;
    determining whether said at least one receiving processing system is to receive said multi-cast broadcast;
    generating a response responsive to a determination that said at least one receiving processing system is to receive said multi-cast broadcast; and
    transmitting said response from said at least one receiving processing system to said intermediate router processing system.
109. The method of claim 108, further comprising:
    transmitting said encryption key from said intermediate router processing system to said at least one receiving processing system responsive to receiving said request.
110. The method of claim 109, further comprising:
    determining whether said encryption key is stored in a memory of said intermediate router processing system;
    transmitting a request for said encryption key from said intermediate router processing system to said security server processing system in response to a determination that said encryption key is not stored in said memory; and
    receiving said encryption key in said intermediate router processing system from said security server processing system.
111. The method of claim 110, further comprising:
    receiving said request from said intermediate router processing system in said security server processing system; and
    transmitting said encryption key from said security server processing system to said intermediate router processing system responsive to receiving said request.
112. The method of claim 111, further comprising:
    establishing a secure connection between said intermediate router processing system and said security server processing system over which to transmit said encryption key.
113. The method of claim 111, further comprising:
    transmitting identification of said at least one receiving processing system from said intermediate router processing system to said security server processing system responsive to receiving said request.
114. The method of claim 113, further comprising:
    storing said identification information for said multi-cast broadcast in a record in a memory of said security server processing system.
115. A system for providing secure multi-cast broadcast, comprising:
    a security server processing system that provides an encryption key; a broadcasting processing system that receives said encryption key from said security server processing system transmitted over a network, encrypts data for a multi-cast broadcast with said encryption key and transmits encrypted data of said multi-cast broadcast over said network, wherein said security server processing system includes a processor and a memory, and wherein said broadcasting processing system includes a processor and a memory; and
    at least one receiving processing system that receives said encryption key from said security processing system over said network, receives said encrypted data from said broadcasting processing system over said network, and decrypts said encrypted data;
    wherein said broadcasting processing system transmits a multi-cast advertisement message prior to said multi-cast broadcast, said multi-cast advertisement message soliciting a response message from said at least one receiving processing system in order to identify said at least one receiving processing system to receive said encryption key.

* * * * *

UNITED STATES PATENT AND TRADEMARK OFFICE
CERTIFICATE OF CORRECTION

PATENT NO. : 7,610,485 B1  Page 1 of 1
APPLICATION NO. : 10/636377
DATED : October 27, 2009
INVENTOR(S) : Navindra Yadav It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1754 days.

Signed and Sealed this

Twelfth Day of October, 2010

David J. Kappos
*Director of the United States Patent and Trademark Office*